Oct. 10, 1944.  R. J. KENT  2,360,237
CABLE GUIDE
Filed Feb. 28, 1942
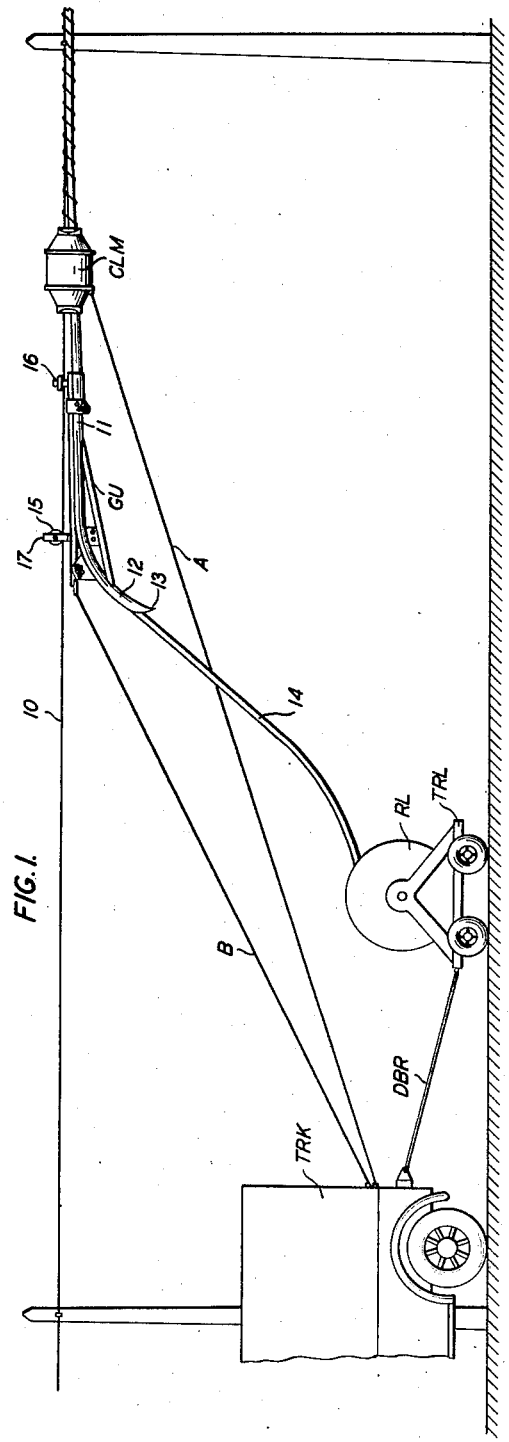
INVENTOR
R. J. KENT
BY J. MacDonald
ATTORNEY Patented Oct. 10, 1944

2,360,237

UNITED STATES PATENT OFFICE 2,360,237

CABLE GUIDE

Robert J. Kent, Summit, N. J., assignor to Bell Telephone Laboratories, Incorporated, New York, N. Y., a corporation of New York Application February 28, 1942, Serial No. 432,785

4 Claims. (Cl. 175—376)

This invention relates to cable guides and more particularly to a combined guide and straightener for use in the installation of aerial cable which is secured to the messenger or supporting stand by having a wire lashed therearound as shown in Patent No. 2,272,253 to E. St. John issued February 10, 1942.

An object of this invention is the provision of a guide which will facilitate the installation of aerial cables by the so-called lashing method, by permitting the cable to be fed directly from the cable reel into the machine which lashes the cable to the supporting strand.

Another object of the invention is the provision of a guide which may be readily adjusted to accommodate cables of different diameters.

A further object of the invention is the provision of a guide which may be readily placed and removed from the cable.

A still further object of the invention is the provision of a guide which will straighten the cable by removing the bows therefrom as the cable passes therethrough.

The combined cable guide and straightener of this invention is intended to be positioned on and ride along the messenger or supporting strand just ahead of the cable lashing machine. A reel of cable is mounted on a suitable cable reel trailer on the ground and as the trailer moves along, the cable passes off the reel, through the guide and into the lashing machine where a wire is wrapped around the cable and the strand to bind the two together.

The cable reel trailer, cable guide and lashing machine are all towed along simultaneously by means of a suitable tractor or truck which travels along the ground underneath the strand.

Other features of this invention will be readily apparent from the following detailed description when read in connection with the following drawing of which:

Fig. 1 illustrates the combined cable guide and straightener of this invention in position on a messenger strand and guiding the cable into the lashing machine as it passes off the reel;

Fig. 2 is a side elevational view of the combined guide and straightener of this invention with the strand and cable shown in dot-dash lines;

Fig. 3 is a view of the draft end of the guide shown in Fig. 2;

Fig. 4 is a view of the opposite end of the guide;

Fig. 5 is a cross-sectional view taken on line 5—5 of Fig. 2; and

Fig. 6 is a cross-sectional view similar to Fig. 5 but adjusted to accommodate a smaller size cable.

As shown in the drawing, the improved guide of this invention is arranged to be slidably mounted on the messenger or supporting strand 10. This guide, which is preferably constructed of steel, comprises an elongated member 11 of substantial U-shaped cross section bent at one end to provide the downwardly extending curved portion 12, the end of which is provided with a widened or flared portion 13 to facilitate the passage of the cable 14 into the guide.

The guide is slidably supported on the messenger or supporting strand 10 by means of a suitable wheel 15 at the draft end and by means of a clevis pin 16 at the opposite end. The wheel 15 is rotatably mounted in the hanger bracket 17 which may be secured, by means of the bolts 18 and 19 to either side of the plate 20 which is welded in position between the bottom member 11 and the brace 21. The clevis pin 16 is removably positioned in the U-shaped clevis member 22 which is secured to the top of the elongated angle member 23 which is positioned in the member 11 and extends substantially the full length thereof.

As shown in Figs. 2, 5 and 6 the angle member 23 is adjustably supported by means of the bracket 24 at one end and by the bolt 25 at the other.

The adjustment of the angle member 23 is accomplished by providing the bracket 24 on the one end with a series of apertures 26 in which the bolt 27, which is in threaded engagement with the lug 28 on the bottom of the member 11, may be selectively positioned. The other end of the member 11 is provided with the upstanding ears 29 and 30 which are also provided with a series of apertures 31. A bolt 25 is selectively positioned in one set of apertures, passes through suitable apertures located in the member 23 and is held in place by means of nut 32 on the end thereof. Thus it is readily apparent that by the proper selection of apertures in the bracket 24 and in the ears 29 and 30 the size of the longitudinal opening or bore formed by the U-shaped member 11 and the angle member 23 may be varied to accommodate cables of different diameters, as shown in Figs. 5 and 6. This structure also facilitates the placing and removing of the guide since the cable need not be threaded therethrough but can be laid therein and the angle member 23 placed thereover in contact therewith and secured in position by means of the bolts 25 and 27, while the guide is supported on the strand 10 by the wheel 15. The guide is removed from the cable in the reverse manner; that is, by removing the bolts 25 and 27, which permits the angle member 23 to be displaced.

In the installation of lashed cable, using the improved guide and straightener of this invention, the cable is fed directly from a cable reel which is towed along on a cable reel trailer attached to a suitable truck or other vehicle, through the guide and straightener and into the lashing machine. As shown in Fig. 1 the cable lashing machine CLM is positioned on the strand 10 and cable 14 with its tow line A secured to the rear end of the truck TRK. The combined guide and straightener GU is positioned on the strand 10 a short distance ahead of the lashing machine CLM, with the wheel 15 and the clevis pin 16 in engagement with the messenger or supporting strand. One end of a tow line B is secured to the ring 33 attached to the draft end of the guide and the other end is secured to the rear end of the truck TRK. The cable 14 is fed from the reel RL mounted on the trailer TRL attached to the rear of the truck TRK by means of the drawbar DBR. Thus as the truck TRK moves along, the entire unit, viz., the lashing machine CLM, the guide and straightener CU, and the reel of cable RL are all towed along simultaneously.

While I have shown and described the preferred form of my invention, it is to be understood that the guide of this invention may be used to advantage when the cable is fed from a stationary reel and the guide is secured to the strand by suitable clamping means. It is not my intention to limit the invention to the precise details shown as various changes and modifications may be made therein without departing from the spirit of the invention and I am only limited by the appended claims.

What is claimed is:

1. A guide for facilitating the installation of aerial cables on a messenger or supporting strand which comprises an elongated trough-shaped member of substantially U-shaped cross-section, an arcuate portion at one end thereof, a wheel rotatably mounted on said member adjacent said arcuate portion and a shackle at the opposite end for supporting said member on a supporting strand, a removable member positioned in and extending the full length of said trough-shaped member and adjustable means attached to each end of said removable member cooperating with means on said trough-shaped member to vary the size of the bore formed by said trough-shaped member and said removable member.

2. A guide for facilitating the installation of aerial cable on a messenger or supporting strand which comprises an elongated trough-shaped member of substantially U-shaped cross-section having an arcuate portion at one end thereof, means secured to said member adjacent said arcuate portion for slidably supporting said member on a supporting strand, a removable member positioned in and extending the full length of said trough-shaped member and means on each end of said removable member cooperating with means on the trough-shaped member to permit the raising and lowering of said removable member to vary the size of the bore formed by said trough-shaped member and said removable member.

3. A guide for facilitating the installation of aerial cable on a messenger or supporting strand which comprises an elongated trough-shaped member of substantially U-shaped cross-section having an arcuate portion at one end thereof, means secured to said member adjacent said arcuate portion for slidably supporting said member on a supporting strand, a removable member having an angular cross-section positioned in and extending the full length of said trough-shaped member and means on each end of said angular member cooperating with means on said trough-shaped member to permit the raising and lowering of said angular member to vary the size of the bore formed by said trough-shaped member and said angular member.

4. A combined guide and straightener for aerial cable comprising an elongated trough-shaped member of substantially U-shaped cross-section having a downwardly curved arcuate portion at one end thereof, an elongated member of angular cross-section adjustably and removably positioned in said trough-shaped member extending the full length thereof and projecting a short distance over said curved portion, means on said curved portion and on the end of said straight portion which cooperates with means on said elongated angular member to permit the raising and lowering of said member to vary the size of the bore formed by the trough-shaped member and elongated angular member, and means on said trough-shaped member at each end thereof for slidably mounting said device on a supporting strand.

ROBERT J. KENT.